May 5, 1953  G. A. GUERNSEY ET AL  2,637,416
CONTROL MECHANISM FOR BRAKE HOLDERS
Filed March 15, 1951

INVENTORS
GLEN A. GUERNSEY
AND ARTHUR H. GREEN
BY Chapin + Neal
ATTORNEYS

Patented May 5, 1953

2,637,416

UNITED STATES PATENT OFFICE 2,637,416

CONTROL MECHANISM FOR BRAKE HOLDERS

Glen A. Guernsey, West Springfield, and Arthur H. Green, East Longmeadow, Mass., assignors to Wico Electric Company, West Springfield, Mass., a corporation of Massachusetts Application March 15, 1951, Serial No. 215,845

3 Claims. (Cl. 188—152)

This invention relates to improvements in control mechanism for the brake holders of automotive vehicles.

Brake holders are particularly useful in automotive vehicles of the type, in which the power of the motor is transmitted through a fluid coupling to the propeller shaft and driving wheels of the vehicle, for the purpose of automatically holding the vehicle stationary, after it has been brought to a stop, without requiring the operator to maintain pressure on the brake pedal. In a hydraulic braking system, the brake holder commonly consists of a valve, which is interposed in the conduit between the master cylinder and the brake cylinders of certain wheels of the vehicles and which, when closed, prevents the return of brake fluid from such cylinders and thus holds applied the brakes of the selected wheels. When this valve closes, fluid under pressure is trapped in the conduit between the valve and the selected brake cylinders, the amount of the pressure varying according to the force with which the operator applies the brake pedal. Various means have heretofore been proposed for causing the brake-holding valve to automatically close after the brakes have been applied and the speed of the vehicle been reduced to a predetermined low value. However, the application of the brake holder invariably at a predetermined low speed does not produce uniformly good results. Much depends on the way the operator brings the vehicle to a stop. A heavy pressure on the brake pedal, that is maintained until the selected predetermined low speed is reached, will result in a lurching stop because the brake-holding valve, closing at this low speed, will trap fluid under high pressure in the brake cylinders and the vehicle will be brought to a sudden stop. Since the brake-holding valve closes at the predetermined low speed and remains closed until the vehicle is subsequently accelerated, the control is taken away from the operator and he will not be able to reduce the braking pressure by relaxing his foot pressure on the brake pedal, as he might wish to do in order to secure a smooth stop. On the other hand, if the operator applies the brakes more gradually, using less pressure applied over a greater time, the brake-holding valve may be closed at the predetermined low speed and result in a smooth stop because much less pressure will be trapped in the brake cylinders when the valve closes.

This invention has for an object the provision of an improved brake holder control, which overcomes the disadvantages aforesaid and which is characterized in that the brake holder is automatically applied after a certain time delay, starting from the time when the speed of the propeller shaft decreases to a certain low value. While the extent of this time delay is variable, it may for example be approximately the time needed to decelerate the propeller shaft at a normal rate from the certain low speed to zero. Then, if the vehicle is decelerated at a higher rate, the brake holder will not be applied until after the vehicle has stopped, and if the vehicle is decelerated at a rate that is slower than normal, the brake holder will be applied before the propeller shaft has entirely stopped.

The invention has for an object the provision in a brake holder control system, of actuating means for the brake holder, such means including a member having a relatively high coefficient of expansion and operable, when expanded to a predetermined extent, to apply the brake holder and maintain it applied, a means for heating the member, and means for controlling the heating means responsive to the speed of the propeller shaft of the vehicle and initiating effective heating of such member at relatively low propeller shaft speeds corresponding to vehicle speeds of a few miles per hour.

The invention has for an object the provision in a brake holder control system of an improved time delay means for closing the starting switch in the energizing circuit of the electrical means that actuates the brake holder, such time delay means consisting of a member which has a high coefficient of expansion and is operable by its contraction and expansion to control the opening and closing of the switch, together with means responsive to the speed of the propeller shaft of the vehicle for controlling the heating of said member and initiating the effective heating of such member at a predetermined propeller shaft speed corresponding to a vehicle speed of a few miles per hour and maintaining effective heating of such member at speeds below said predetermined speed.

The invention has for a further object the provision of a time delay switch in the energizing circuit of the actuating means for the brake holder, such switch including a resistance wire holding the contacts of the switch separated against the force of a spring tending to engage the contacts, and means responsive to the speed of the propeller shaft of the vehicle for controlling the heating of such wire and initiating effective heating of the wire at relatively low propeller shaft speeds corresponding to vehicle speeds of only a few miles per hour.

These and other objects will best be understood from the detailed description of one illustrative example of the invention in the accompanying drawings, in which.

Figure 1:
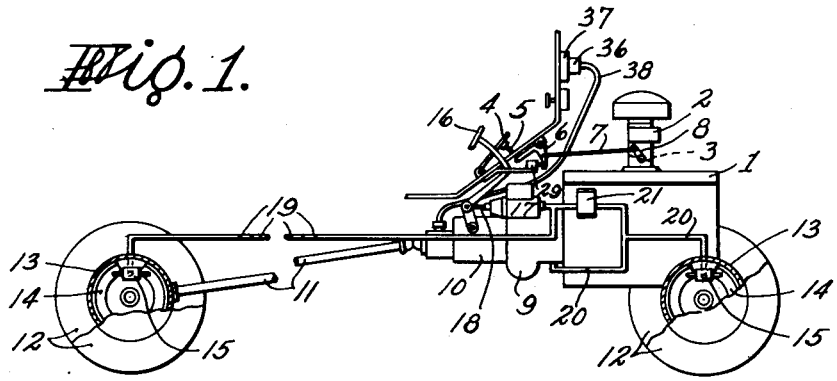
Fig. 1 is an elevational view of a wheeled, motor-driven vehicle embodying the invention, such parts of the vehicle as are unnecessary to an understanding of the invention being omitted.

In Fig. 1, there has been shown in diagrammatical form those parts of a motor-driven wheeled vehicle that need to be considered for an understanding of the present invention. There are shown the motor 1; carburetor 2; throttle valve 3; an accelerator pedal 4, operable when depressed to open valve 3 through suitable connections, such as rod 5, lever 6, rod 7 and lever 8; hydraulic clutch 9; transmission 10; propeller shaft 11; wheels 12, the rear ones of which are driven from shaft 11 in the usual way; brake drums 13 on wheels 12; brake shoes 14 in each drum; brake cylinders 15 one within each drum for actuating the brake shoes by hydraulic pressure; a brake pedal 16; and a master cylinder 17, having therein the usual piston (not shown), which is connected, as by rod 18, to pedal 16 to be actuated by the latter, when depressed, and transmit pressure through conduits 19 to the brake cylinders on the rear wheels and through conduits 20 to the brake cylinders on the front wheels.

Figure 2:
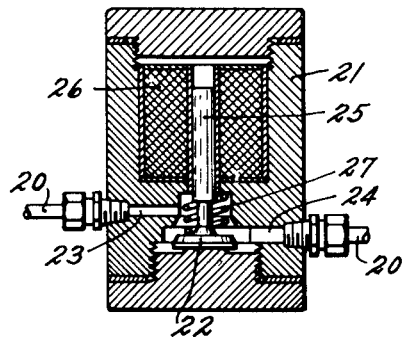
Fig. 2 is a sectional elevational view of an electromagnetically-controlled, brake-holding valve, suitable for use with the invention.

The brake holder is indicated generally at 21 in Fig. 1. It includes a normally open valve of any suitable kind adapted to be interposed in the conduit between the master cylinder 17 and those brake cylinders 15, which it is desired to control. In this case, the brake holder is interposed in the conduit 20 leading only to the brake cylinders of the front wheels, which is deemed preferable although, as is well known in the art, the brake holder may also be made to control only the brakes of the rear wheels or the brakes of all the wheels. An illustrative example of one valve unit, suitable for the purpose, is shown in Fig. 2. The casing 21 has slidably mounted therein a valve 22 for controlling the communication between inlet and outlet passages 23 and 24, respectively connected on the master cylinder side and brake cylinder side to the conduit 20. The stem of valve 22 is in part a magnetic plunger 25 cooperating with a solenoid 26. A spring 27 tends to hold the valve open. This solenoid, when energized sufficiently, will close valve 22 against the pressure of spring 27. Brake holders of this general type, for the purpose described, are old and well known in the art.

The present invention has to do with the control of the brake holder and particularly with the automatic application of it, by a simplified and improved time-delay means, the action of which is initiated by means responsive to the speed of the propeller shaft of the vehicle and which causes the brake holder to function to hold the brakes at or about the time that the vehicle is brought to a stop or shortly after the vehicle is stopped, the time of application of the brake holder being manually variable to suit the driver of the vehicle and the time delay provided by the time-delay means being to some extent automatically variable depending on the rate at which the propeller shaft is decelerated.

Figure 3:
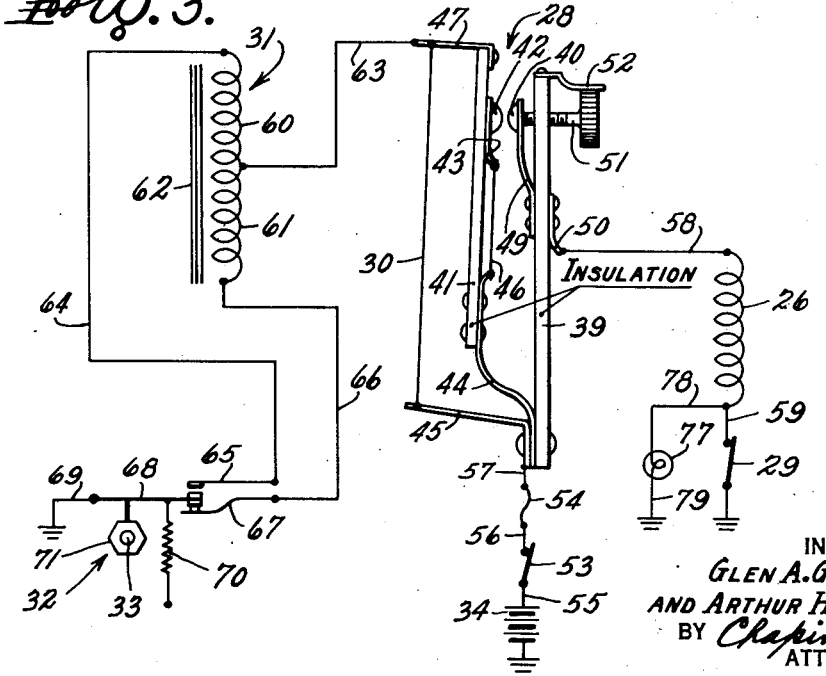
Fig. 3 is an electrical diagram of the control system of the brake-holding means.

The control system is shown in one form in Fig. 3. It includes a switch 28 for closing the energizing circuit of the brake-holder solenoid 26; a release switch 29, actuated by the accelerator 4 being closed when the accelerator is released and in engine-idling position and opened in all other positions; a time-delay means 30, and a voltage control or current-limiting means, which includes a choke coil arrangement 31 together with a switching means 32 adapted to be driven from propeller shaft 11, as for example from the speedometer shaft 33. Energy is derived from the storage battery 34 of the motor vehicle. The switch 28, time-delay means 30, and voltage control means, except for the switching means 32, may conveniently be mounted in one suitable case (not shown). The switch means 32 may be mounted in a case 36, shown in Fig. 1 as located in back of the speedometer 37 of the vehicle. The shaft 33 is contained in the usual flexible sheath, indicated at 38, and driven from propeller shaft 11 in the usual manner (not shown). The release switch 29 is mounted adjacent the accelerator.

The control switch 28 includes a stationary member 39, which is of insulating material and from which one contact 40 of the switch is adjustably supported, and a second and movable member 41, which is also of insulating material and to which the other contact 42 of the switch and a terminal clip 43 are suitably fixed. The movable member 41 is fixed to one end of a leaf spring 44, the other end of which, together with a rigid metallic bracket 45, is suitably fixed to the first member 39. The clip 43 is connected by a jumper wire 46 to spring 44. The movable member 41 has fixed to its other end a rigid bracket 47. The time delay means 30 consists of a resistance wire, which interconnects the brackets 45 and 47 and is suitably fixed at its ends, one to each. This wire 30 normally controls the movement of member 41 by the spring 44 in the direction which tends to engage the contacts 42 and 40, and thus close switch 28. When wire 30 is heated it elongates and allows spring 44 to move the contacts 40 and 42 into engagement. When wire 30 cools it moves member 41 against the force of spring 44 to disengage these contacts and open switch 28. The switch contact 40, as herein shown, is fixed to one end of a leaf spring 49, the other end of which, together with a terminal clip 50, are suitably fixed to member 39. A screw 51, threaded into member 39, bears against spring 49 and, when turned, causes the contact 40 to move toward or away from contact 42, whereby the distance between the contacts may be varied to vary the time required to engage the contacts. The screw 51 may be held in its various positions of adjustment in any suitable way, as for example, by a spring 52 engaging the head of the screw.

The switches 28, 29 and solenoid 26 are included in series in an energizing circuit that includes the battery 34, a manual switch 53, which may be the usual ignition switch, and a fuse 54. This circuit may be traced as follows, from the ungrounded side of battery 34, by a wire 55, closed ignition switch 53, a wire 56, fuse 54, a wire 57, spring 44, wire 46, clip 43, engaged contacts 42 and 40, spring 49, clip 50, a wire 58, coil 26, a wire 59, and release switch 29 to the ground and thus to the other terminal of battery 34.

The voltage-control means includes a coke coil having two equal sections 60 and 61, mounted on a magnetizable core 62. The junction of these sections is connected by a wire 63 to the time-delay means 30. The other terminal of coil section 60 is connected to the switching means 32. Such means includes spring contact fingers 65 and 67 respectively connected by wires 64 and 66 to the other terminals of coil sections 60 and 61 and a pivoted switch member 68 for alternately engaging the free ends of the contact fingers 65 and 67. The other end of member 68 is connected by a wire 69 to the ground and thus to the grounded side of battery 34. The switch arm 68 is drawn by a spring 70 into engagement with a cam 71, which is fixed to the speedometer shaft 33. As shown, this cam has six lobes and thus the switch arm 68 will be oscillated six times during each revolution of shaft 33. The shaft of a standard speedometer turns 1000 revolutions per mile. Hence, at a vehicle speed of say three miles per hour, shaft 33 will turn at 50 revolutions per minute and the switch arm 68 will be oscillated 300 times per minute at the described low vehicle speed. This switch arm is arranged to move into engagement with, and then, by continued movement, flex each spring contact finger. It is also arranged to engage one spring contact finger before it disengages from the other. Thus the finger 67, which as illustrated has been previously flexed downwardly, will move upwardly, as switch arm 68 swings upwardly until the latter engages spring contact finger 65. Continued upward movement of arm 68 will flex finger 65 upwardly and cause it to disengage from spring contact finger 67. The arrangement is such that one finger or the other is always connected to switch arm 68. Thus, one section 60 or the other section 61 of the choke coil is always connected (whenever the ignition switch 53 is closed) in a circuit which includes battery 34 and the resistance wire 30.

When the circuit is closed to one section of the choke coil, a current flow is established but, due to the inductance of the coil, there is a lag in building up current and time is required for the current to reach its maximum value. As the speed of the cam 71 increases, the time interval, during which a circuit to either section of the choke coil is closed, decreases and the maximum values to which the current can build up decrease. A current flow is built up through one section of the choke coil in one direction and then through the other section of the choke coil in the opposite direction and a pulsating direct current wave is produced.

Figure 4:
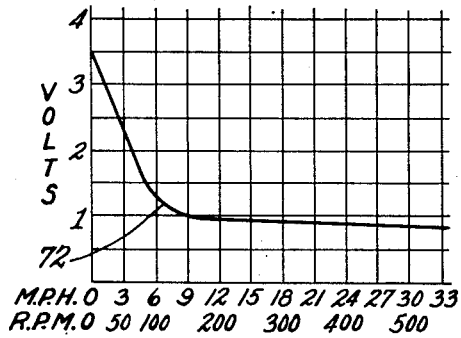
Fig. 4 is a graph illustrative of the operation of the voltage varying means.

The choke coil and breaker arrangement constitute a means for varying the voltage applied to the time-delay means 30. One illustrative example of the result obtained is shown in the graph 72 of Fig. 4, which shows voltage at the output wire 63 plotted against propeller shaft speed in revolutions per minute and also against vehicle speed in miles per hour (assuming no slippage of the driving wheels). Maximum voltage is obtained when the propeller shaft is stopped and both choke coil sections 60 and 61 are connected to the battery at the same time and in parallel. This maximum may be, for example 3.5 volts. When only one choke coil section is connected, the maximum value will be somewhat less, say for example 3 volts. As the propeller shaft 11 speeds up, an initially very rapid decrease in voltage is secured, the voltage dropping to say 1.5 volts, when a car speed of 5 miles per hour is attained, and thereafter, the decrease is at a much slower rate. The voltages below 1.5 volts are in this case insignificant because they are not effective to actuate the time-delay means sufficiently to clost switch 28.

The switching means 32, diagrammatically shown in Fig. 3, may, for example, be constructed as disclosed in copending application Serial No. 211,512, filed February 17, 1951.

In the particular illustrative example shown herein, each of the choke coils 60 and 61 consists of 400 turns of No. 26 wire and has a resistance of 6 ohms. These coils are simultaneously wound and mounted on a core 62 which is made up of standard E and I laminations of silicon steel. The wire 30 consists of a piece of No. 36 "Tophet C" resistance wire 2½ inches long, having a resistance of 3.62 ohms and a high coefficient expansion. These values are not critical and may be varied considerably. The set of values given merely illustrates one set that has been found suitable for the purpose and, since there are many other values that are suitable, it is not desired to limit the invention to the one set, herein disclosed.

It has been found desirable in order to effect a smooth release of the brakes to shunt across the accelerator switch 29 a ballast resistor having a resistance, which is low when the resistor is cold and which rises rapidly when the resistor becomes hot. One resistor, suitable for the purpose, is a 3 C. P., 6–8 volt automotive type lamp 77. One terminal of this lamp is connected by a wire 78 to wire 59 and the other terminal of the lamp is connected by a wire 79 to the ground. When the switch 29 is closed, lamp 77 is shunted out and full current flows through the coil 26. When switch 29 opens, the lamp is placed in series with coil 26 and by its resistance decreases the current flowing through coil 26. The resistance of the lamp, when cold, is relatively low but it increases rapidly, as the filament becomes heated, soon reaching a value such that the current through coil 26 is decreased sufficiently to allow valve 22 to open. The arrangement effects a gradual reduction in current flow in coil 26 and thus a gradual reduction of the force opposing spring 27 so that the valve 22 opens gradually, thus avoiding the sudden opening of the valve and resulting sudden release of the brakes, that would otherwise occur.

In the operation of decelerating the vehicle, the operator will release the accelerator 4, allowing the latter to move to engine-idling position and the accelerator switch 29 to close. Pressure on pedal 16 will cause the brakes to be applied and the vehicle to be decelerated at a rate varying with the degree of hydraulic pressure employed. While the energizing circuit of the wire 30 is closed at all times, when the ignition switch 53 is closed, the voltage available, at relatively high propeller shaft speeds, say those corresponding to vehicle speeds above 5 miles per hour, are of insignificant value and are not effective, regardless of the length of time of application, to cause enough current to flow through this wire 30 to materially heat the same and cause engagement of the contacts of switch 28. Effective values of applied voltage, commence when the propeller shaft speed decreases to a predetermined low value, say for example, that corresponding to a vehicle speed of 5 miles per hour. As the propeller shaft speed decreases below the last-named speed, the voltage applied to wire 30 rises rapidly, as shown by graph 72 of Fig. 4, resulting in rapidly rising current, which soon heats the wire and causes contact 42 to move toward and eventually into engagement with contact 40. Engagement of these contacts closes the energizing circuit to the brake holder solenoid 26. The latter closes valve 22 against the force of spring 27 and traps brake fluid in the brake cylinders of the front wheels.

The extent of the time delay is manually variable by adjustment of the spacing of the contacts 40 and 42 as by means of screw 51. This enables adjustment of the control to suit the driving habits of different operators. Then also, the extent of the time delay will vary to some extent with the rate of deceleration because of variation in voltage applied to wire 30. For example, if the driver should apply the brakes suddenly and lock the wheels, the maximum effective voltage of 3.5 volts would be immediately available and less time would be required to heat wire 30 to the necessary degree than if the driver should decelerate at a normal rate, when the voltage would vary from the minimum to the maximum effective values and the average voltage would be less, whereby slightly more time would be required to heat the wire 30 for the purpose. Also, if the wire 30 is cold, as at starting or for other reasons to appear, the contacts 40 and 42 are more widely separated and more time is required to move them together, say about two seconds. Under normal operating conditions the time delay is about one and one-half seconds.

The time of application of the brake holder depends on the rate of deceleration of the propeller shaft. The brake holder will be applied in a certain time after the propeller shaft has decreased to a relatively low speed, say, for example, one corresponding to a vehicle speed of 5 miles per hour. If the reduction speed of the propeller shaft from the last-named speed to zero occurs at a normal rate, the brake holder will be applied at or about zero speed. A higher rate of deceleration of the propeller shaft will bring its speed to zero in less time than that afforded by the time-delay means and the brake holder will not be applied until after the vehicle stops. This allows the operator to maintain control of the braking pressure to the very end of the deceleration period, enabling him to decrease the braking pressure and avoid the lurching stop that results, when the brake holder closes before the vehicle stops and braking fluid under relatively high pressure is trapped in the brake cylinders. If the deceleration is effected at a rate slower than normal, the brake holder will be applied before the propeller shaft stops but, since relatively low braking pressure is used, trapping of fluid in the brake cylinders by the closing of the brake holder valve will not adversely affect the smoothness of the stop. If the driver should coast to a stop, the brake holder may be applied at a propeller shaft speed corresponding to a vehicle speed of about 2½ miles per hour but there will be no braking pressure available until the driver presses on the brake pedal 16. In general, a quick stop results in a quick application of the brake holder and a slow stop results in a slow application of the brake holder. A driver, who is in the habit of decelerating his car at high rates, will wish the control adjusted for a shorter time delay than the driver who customarily decelerates his car at a slower rate.

The use of the brake holder on the front wheels only affords desirable anti-skid protection. If the driver applies his brakes to lock the wheels, while they are on ice, the brake holder will be applied in a few seconds but it will not hold braking pressure in the rear wheels, so that the driver can release his brake in order to pull the car out of a skid, allowing the rear wheels to turn and, as soon as they reach the release speed the brake-holder valve will open. However, the delay afforded by the time-delay means, after the brakes lock the wheels, is normally sufficient for the operator to take the necessary action without the necessity of the rear wheels having to return to the release speed.

The invention thus affords a brake-holder control that is based on a very simple form of time-delay means, the effective action of which is initiated, when the propeller shaft of the vehicle reaches a certain low speed, and the extent of which may be approximately the time needed to decelerate such shaft at a normal rate from the above-mentioned low speed to zero. The control may, for example, be adjusted so that the brake holder will be applied at zero propeller shaft speed, when deceleration is at a normal rate of say from 8 to 10 feet per second per second. Then, if a high rate of deceleration, say for example 18 feet per second per second, is used over the entire period of deceleration, the brake holder will not be applied until after the propeller shaft has stopped. However, if the high rate is used initially, and later the braking pressure is relaxed, the brake holder can be applied at zero speed.

The invention affords a time-delay type of brake holder control that is applicable to any type of automobile. The control is extremely simple and is adapted for quantity production at low unit cost and is readily adjustable to suit the wishes of different drivers.

What is claimed is:

1. A brake control means for wheeled vehicles, comprising, a brake holder, electrical means for actuating the brake holder, an energizing circuit for said means adapted for connection to a source of electricity, a switch in said circuit, a member having a relatively high coefficient of expansion for controlling the actuation of said switch respectively closing and opening the same by its expansion and contraction, a normally closed heating circuit for said member adapted for connection to a source of electricity, voltage-varying means in said heating circuit and including a rotatable actuator adapted for connection to the propeller shaft of the vehicle and to be driven by and at speeds proportional to the speeds of such shaft, said voltage-varying means varying the voltage in the heating circuit inversely with the speed of its actuator and initiating effective heating of said member at a predetermined low speed, corresponding to a low vehicle speed of only a few miles an hour, to cause said member to be heated sufficient to actuate said switch and maintaining said member effectively heated at all speeds below said predetermined speed.

2. Brake control means for wheeled vehicles, comprising, a brake holder, electrical means for actuating the brake holder, an energizing circuit for said means adapted for connection to a source of electricity, a starting switch in said circuit, a release switch in said circuit and adapted to be respectively closed and opened when the vehicle is decelerated and accelerated, a resilient means tending to close the starting switch, a resistor having a high coefficient of expansion and connected to the starting switch for holding the same open against the force of said resilient means when the resistor is relatively cool and operable when expanded to a predetermined extent to allow said resilient means to close the starting switch, a circuit including said resistor and adapted for connection to a source of electricity, and voltage-varying means in the last-named circuit and including a rotatable actuator adapted for connection to the propeller shaft of the vehicle and to be driven by and at speeds proportional to the speeds of such shaft, said voltage-varying means varying the voltage applied to said resistor inversely with the speed of said actuator and operable to reduce such voltage to values ineffective to heat said resistor sufficiently to expand to said extent except at or below a predetermined low speed of said actuator corresponding to a vehicle speed of a few miles per hour.

3. Brake control means for wheeled vehicles, comprising, a brake holder, electrical means for actuating the brake holder, an energizing circuit for said means adapted for connection to a source of electricity, a starting switch in said circuit, a release switch in said circuit and adapted to be respectively closed and opened when the vehicle is decelerated and accelerated, resilient means tending to close the starting switch, a resistance wire holding said starting switch open against the force of said resilient means and operable by elongation to a predetermined extent when heated to allow the starting switch to be closed by said resilient means, a normally closed circuit including said wire and adapted for connection to a source of electricity, and voltage-varying means in the last-named circuit and including a rotatable actuator adapted for connection to the propeller shaft of the vehicle and to be driven by and at speeds proportional to the speeds of such shaft, said voltage-varying means varying the voltage applied to said wire inversely with the speed of said actuator and operable to reduce such voltage to values ineffective to heat said wire sufficiently to elongate to said extent except at or below a predetermined low speed of said actuator corresponding to a vehicle speed of a few miles per hour.

GLEN A. GUERNSEY.
ARTHUR H. GREEN.

References Cited in the file of this patent

UNITED STATES PATENTS

| Number | Name | Date |
| --- | --- | --- |
| 2,187,789 | Lanz | Jan. 23, 1940 |
| 2,502,118 | Ashton et al. | Mar. 28, 1950 |